United States Patent
Saari et al.

(10) Patent No.: US 9,654,757 B2
(45) Date of Patent: May 16, 2017

(54) METHOD, APPARATUS, AND COMPUTER PROGRAM PRODUCT FOR INCLUDING DEVICE PLAYBACK PREFERENCES IN MULTIMEDIA METADATA

(71) Applicant: Nokia Technologies Oy, Espoo (FI)

(72) Inventors: Jarmo Ilkka Saari, Turku (FI); Timo Juhani Toivanen, Mantsala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/781,824

(22) Filed: Mar. 1, 2013

(65) Prior Publication Data

US 2014/0248036 A1    Sep. 4, 2014

(51) Int. Cl.
*H04N 9/80*      (2006.01)
*H04N 9/82*      (2006.01)
(Continued)

(52) U.S. Cl.
CPC ......... *H04N 9/8205* (2013.01); *G11B 27/105* (2013.01); *G11B 27/3027* (2013.01)

(58) Field of Classification Search
CPC .............. G11B 27/034; G11B 2220/90; G11B 2220/2545; G11B 27/105; G11B 2220/2562; G11B 27/002; G11B 27/34; G11B 27/28; G11B 2220/213; G11B 27/11; G11B 2220/2529; G11B 27/329; G11B 27/36; H04N 5/2251; H04N 21/4223; H04N 5/23293; H04N 5/775; H04N 5/77; H04N 9/8205; H04N 5/23203; H04N 5/765; H04N 9/8063; H04N 21/42202; H04N 21/42204;
(Continued)

(56) References Cited

U.S. PATENT DOCUMENTS 5,796,828 A * 8/1998 Tsukamoto et al. .......... 380/203
8,086,651 B2   12/2011 Thomas
(Continued)

FOREIGN PATENT DOCUMENTS

EP    1 189 437      3/2002
GB    2 456 835 A    7/2009
(Continued)

OTHER PUBLICATIONS

Set Different Equalizer Settigns for Each Song in iTunes [online] [retrieved Oct. 17, 2012]. Retrieved from the Internet: <URL: www.guidingtech.com/12873/set-different-equalizer-settings-each-song-itunes/>. 11 pages.
(Continued)

*Primary Examiner* — Tat Chio
(74) *Attorney, Agent, or Firm* — Alston & Bird LLP

(57) ABSTRACT

A method, apparatus, and computer program product are provided in order to provide device playback preferences in multimedia file metadata. A method is provided comprising identifying one or more playback devices; receiving a file to be played back; searching one or more data in the file for playback settings of the one or more playback devices; processing one or more playback settings for the one or more playback devices based on the one or more data; and causing play back of the file with the one or more playback devices. A corresponding apparatus and a computer program product are also provided.

18 Claims, 6 Drawing Sheets

(51) Int. Cl.
*G11B 27/10* (2006.01)
*G11B 27/30* (2006.01)

(58) Field of Classification Search
CPC .... H04N 21/4334; H04N 21/84; H04N 5/232; G06F 17/30905; G06F 3/012; G06F 17/30277; G06F 17/30764; G06F 2203/0382; G06F 3/017; G06F 3/041; G06F 3/04883; G06F 8/10; G06F 8/60
See application file for complete search history.

(56) References Cited

U.S. PATENT DOCUMENTS

| | | |
|---|---|---|
| 2003/0007001 A1 | 1/2003 | Zimmerman et al. |
| 2004/0126102 A1* | 7/2004 | Oikawa .................. 386/125 |
| 2007/0198430 A1 | 8/2007 | Takahashi et al. |
| 2008/0175411 A1 | 7/2008 | Greve et al. |
| 2009/0047993 A1 | 2/2009 | Vasa |
| 2009/0183622 A1 | 7/2009 | Parash |
| 2009/0290725 A1 | 11/2009 | Huang et al. |
| 2010/0162117 A1 | 6/2010 | Basso et al. |
| 2010/0299151 A1 | 11/2010 | Soroka et al. |
| 2011/0091187 A1 | 4/2011 | Duffin et al. |
| 2011/0109730 A1* | 5/2011 | Aubey et al. .................. 348/51 |
| 2011/0125787 A1 | 5/2011 | Choi et al. |
| 2011/0219097 A1 | 9/2011 | Crockett et al. |

FOREIGN PATENT DOCUMENTS

| | | |
|---|---|---|
| WO | WO 2005/122147 A2 | 12/2005 |
| WO | WO 2010/056206 | 5/2010 |

OTHER PUBLICATIONS

International Search Report and Written Opinion for Application No. PCT/FI2014/050102 dated May 23, 2014.
APE tag—Wikipedia, the free encyclopedia [online] [retrieved Feb. 13, 2013]. Retrieved from the Internet: <URL: http://en.wikipedia.org/wild/APE_tag>. 2 pages.
Broadcast Wave Format—Wikipedia, the free encyclopedia [online] [retrieved Feb. 13, 2013]. Retrieved from the Internet: <URL: http://en.wikipedia.org/wiki/Broadcast Wave Format>. 3 pages.
d3v2.3.0—ID3.org [online] [retrieved Jun. 9, 2016]. Retrieved from the Internet: <URL: http://id3.org/d3v2.3.0>. (dated Feb. 3, 1999) 49 pages.
ID3—Wikipedia, the free encyclopedia [online] [retrieved Jun. 9, 2016]. Retrieved from the Internet: <URL: https://en.wikipedia.org/wild/ID3>. 12 pages.
Resource Interchange File Format—Wikipedia, the free encyclopedia [online] [retrieved Feb. 13, 2013]. Retrieved from the Internet: <URL: http://en.wikipedia.org/wild/Resource_Interchange_File_Format>. 5 pages.
Vorbis comment—Wikipedia, the free encyclopedia [online] [retrieved Feb. 13, 2013]. Retrieved from the Internet: <URL: http://en.wikipedia.org/wiki/Vorbis_comment>. 2 pages.
Extended European Search Report for corresponding European Application No. 14756254.0 dated Feb. 8, 2017, 8 pages.

* cited by examiner

- Example ID3 Tag content (headers and frames)
  - Header: "Nxx CUSTOM"
  - Frame #1:
    - Device identifier ("Lxx 800")
    - Number of audio settings and how they are identified:
      - For example: 10 setting, Frame #3 is for "Jxx" setting
  - Frame #2: Audio settings: ...
  - Frame #3: Audio settings:
    - Equalisation
    - Volume
    - Spatial surround effect
    - .. Other non feedback type audio DSP setting ...

Device specific metada

METHOD, APPARATUS, AND COMPUTER PROGRAM PRODUCT FOR INCLUDING DEVICE PLAYBACK PREFERENCES IN MULTIMEDIA METADATA

TECHNOLOGICAL FIELD

An example embodiment of the present invention relates generally to multimedia data, and more specifically, to providing device playback preferences for multimedia data.

BACKGROUND

Many computing devices, such as mobile terminals, e.g., media players, cellular telephones, smart phones, tablet computers or the like, capture, store, or otherwise have the access to a plurality of video and audio files. As the consumption of multimedia increases, consumers are more often using mobile devices as the primary source for accessing the multimedia data. When playing back an audio file using a mobile device, consumers may stream the audio to a variety of devices such as headsets, vehicle audio, portable speakers, home stereos, and the like. Many of these devices are used in a variety of environments and a user may consume the audio files using multiple devices throughout the day. Each of the playback devices may have unique reproduction capabilities or provide a different environment and might require adjustments or fine tuning to provide the same listening experience when listening to an audio file.

BRIEF SUMMARY

Embodiments of the present invention relate to an intelligent playback system wherein device playback parameters are provided using multimedia track metadata so that higher quality media playback may be achieved based on the connected device and the provided metadata. Embodiments may provide track specific settings for a type of output interface (e.g., speaker, headset, or the like) to the playback device and allow for the settings data to be carried with the track across devices.

A method, apparatus and computer program product are therefore provided according to an example embodiment of the present invention in order to provide device playback preferences in multimedia file metadata.

In one embodiment, a method is provided that at least includes identifying one or more playback devices; receiving a file to be played back; searching one or more data in the file for playback settings of the one or more playback devices; processing one or more playback settings for the one or more playback devices based on the one or more data; and causing play back of the file with the one or more playback devices.

In some example embodiments, the one or more data may comprise metadata for playback settings of one or more playback devices. In some example embodiments, the one or more data may be provided in the file to be played back and/or in a separate data file. In some example embodiments, the one or more data may provide one or more indications for selecting the playback settings and/or one or more values for the playback settings.

In some example embodiments, the one or more data may comprise one or more sets of playback settings for the one or more playback devices. In some example embodiments, the one or more sets of playback settings may be based at least in part on one or more of artist-specific recommendations, distributor-specific recommendations, device specific recommendations, context specific recommendations, and user device-specific preferences. In some example embodiments, the one or more sets of playback settings can be modified by the user. In some example embodiments, context information may be determined by the playback device and the playback settings may be adjusted automatically based on the determined context.

In some example embodiments, the method may further include receiving changes to playback settings of the playback device during play back of the file and causing the changed playback settings to be stored. In some example embodiments, the changed playback settings may be stored in at least one of a file comprising the changed playback settings and the one or more data, a file comprising the changed playback settings by overwriting the one or more data, an internal memory comprising the changed playback settings or the file and a memory location accessible by the playback device.

In some example embodiments, the one or more playback settings for the playback device are provided in the file using at least one of: ID3 Tags, APE Tags, Resource Interchange File Format (RIFF) Tags, Vorbis Comments, or Broadcast Wave Format (BWF).

In another embodiment, an apparatus is provided comprising at least one processor and at least one memory including computer program instructions, the at least one memory and the computer program instructions configured to, with the at least one processor, cause the apparatus at least to: identify one or more playback devices; receive a file to be played back; search one or more data in the file for playback settings of the one or more playback devices; process one or more playback settings for the one or more playback devices based on the one or more data; and cause playback of the file with the one or more playback devices.

In some example embodiments, the apparatus further comprises the at least one memory and the computer program instructions further configured to, with the at least one processor, cause the apparatus to receive changes to playback settings of the playback device during play back of the file; and cause the playback settings to be stored. In some example embodiments, the changed playback settings may be stored in at least one of a file comprising the changed playback settings and the one or more data, a file comprising the changed playback settings by overwriting the one or more data, an internal memory comprising the changed playback settings or the file and a memory location accessible by the playback device.

In a further embodiment, a computer program product is provided comprising at least one non-transitory computer-readable storage medium bearing computer program instructions embodied therein for use with a computer, the computer program instructions comprising program instructions configured to: identify one or more playback devices; receive a file to be played back; search one or more data in the file for playback settings of the one or more playback devices; process one or more playback settings for the one or more playback devices based on the settings in the one or more data; and cause playback of the file with the one or more playback devices.

In some example embodiments, the computer program product further comprises program instructions configured to receive changes to playback settings of the playback device during play back of the file; and cause the playback settings to be stored. In some example embodiments, the changed playback settings may be stored in at least one of a file comprising the changed playback settings and the one or more data, a file comprising the changed playback settings by overwriting the one or more data, an internal memory comprising the changed playback settings or the file and a memory location accessible by the playback device.

In another embodiment, an apparatus is provided comprising means for identifying one or more playback devices; means for receiving a file to be played back; means for searching one or more data in the file for playback settings of the one or more playback devices; means for processing one or more playback settings for the one or more playback devices based on the playback settings in the one or more data; and means for causing playback of the file with the one or more playback devices.

In some example embodiments, the apparatus further comprises means for receiving changes to playback settings of the playback device during play back of the file and causing the changed playback settings to be stored. In some example embodiments, the changed playback settings may be stored in at least one of a file comprising the changed playback settings and the one or more data, a file comprising the changed playback settings by overwriting the one or more data, an internal memory comprising the changed playback settings or the file and a memory location accessible by the playback device.

BRIEF DESCRIPTION OF THE DRAWINGS

Figure 1:
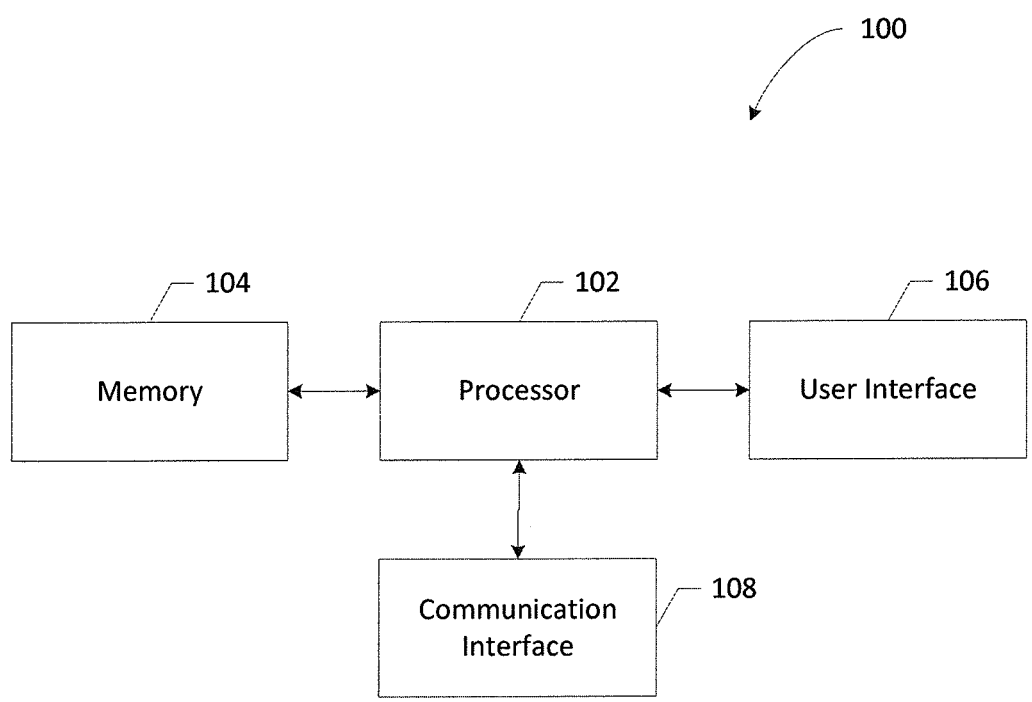
Figure 2:
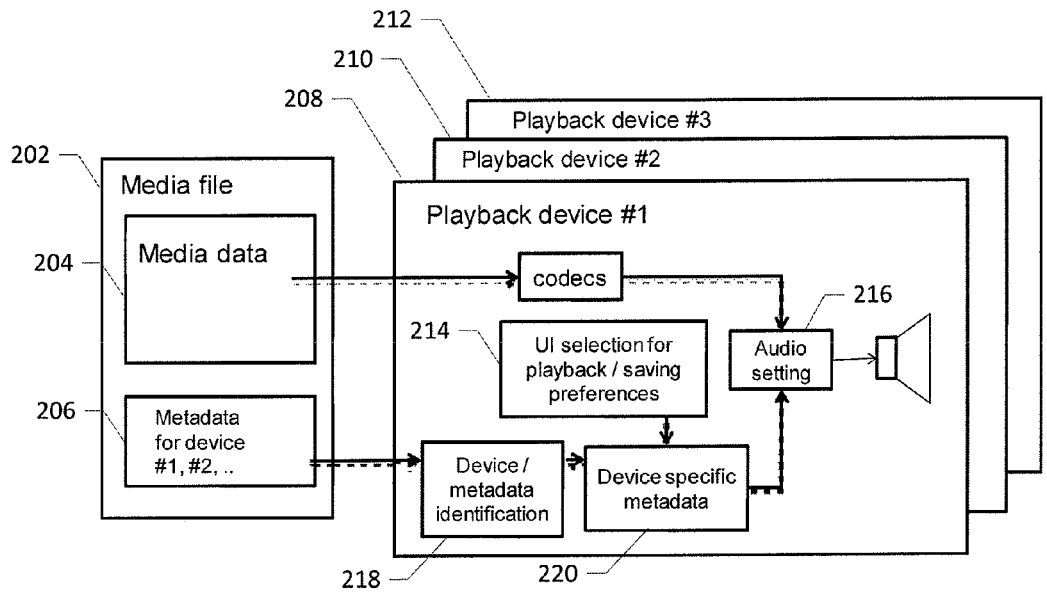
Figure 3:
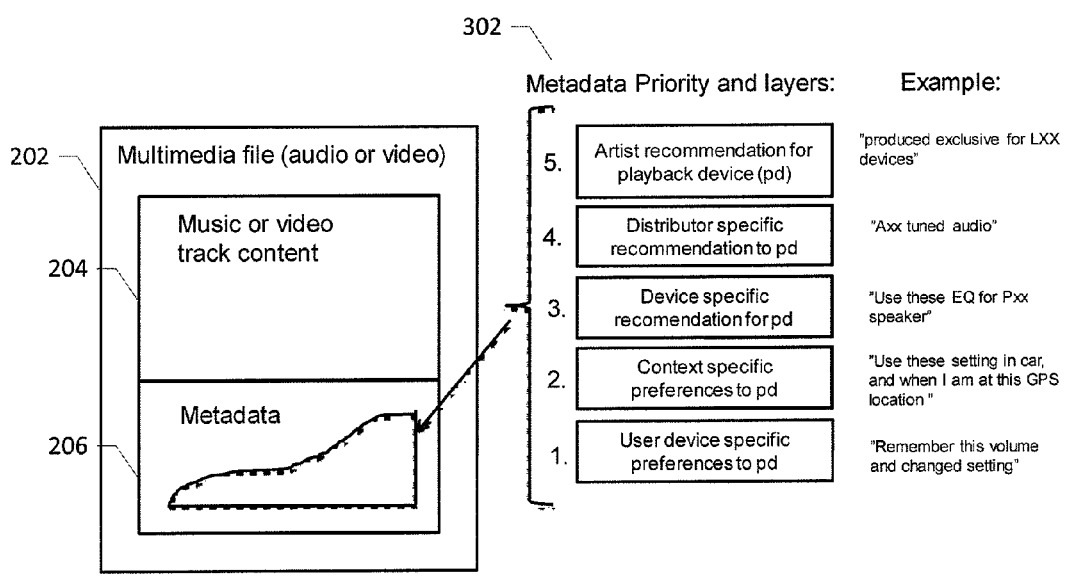
Figure 4:
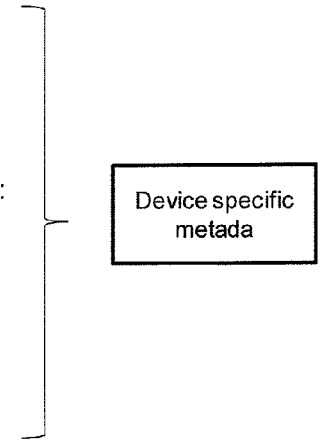
Figure 5:
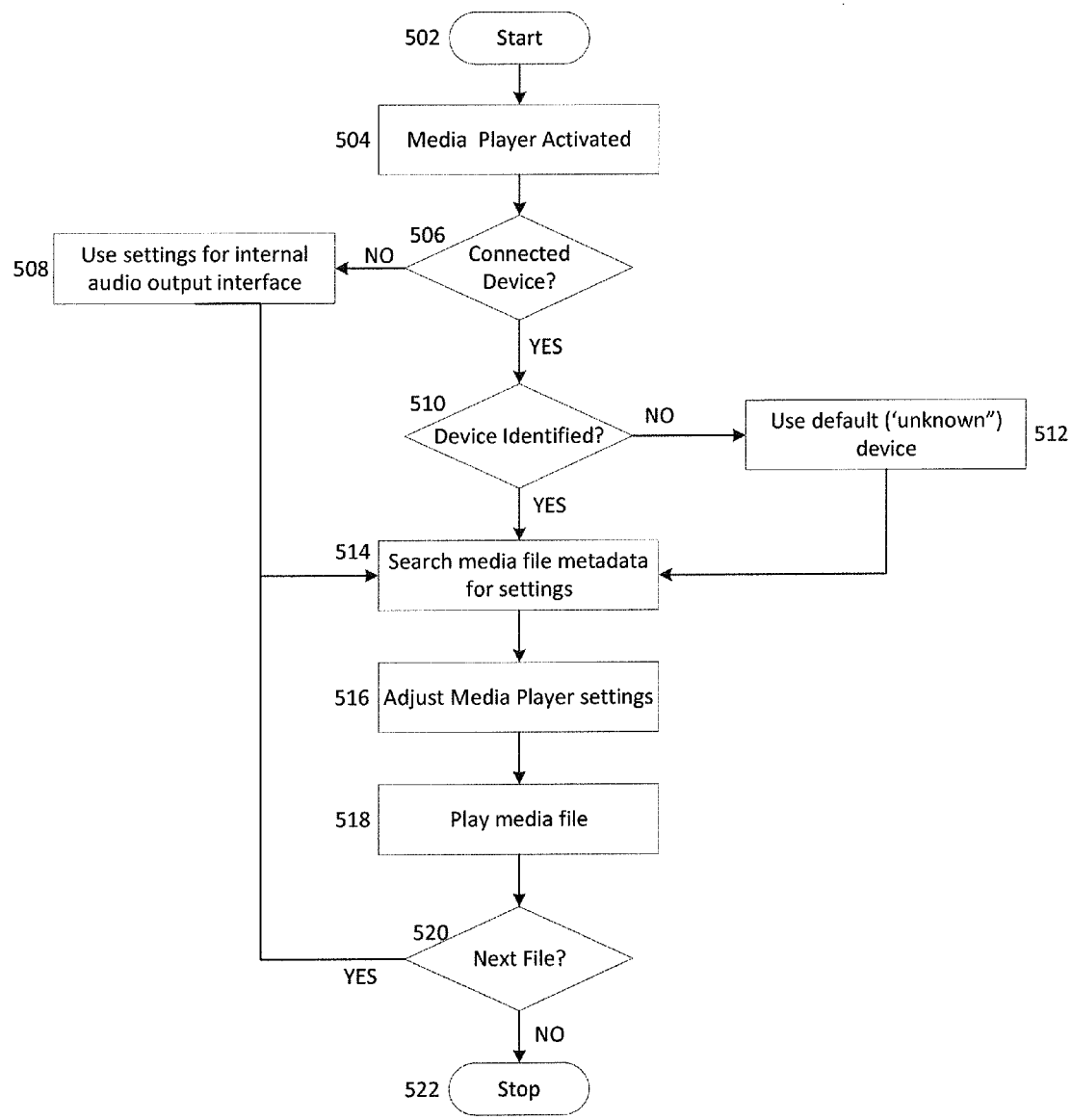
Figure 6:
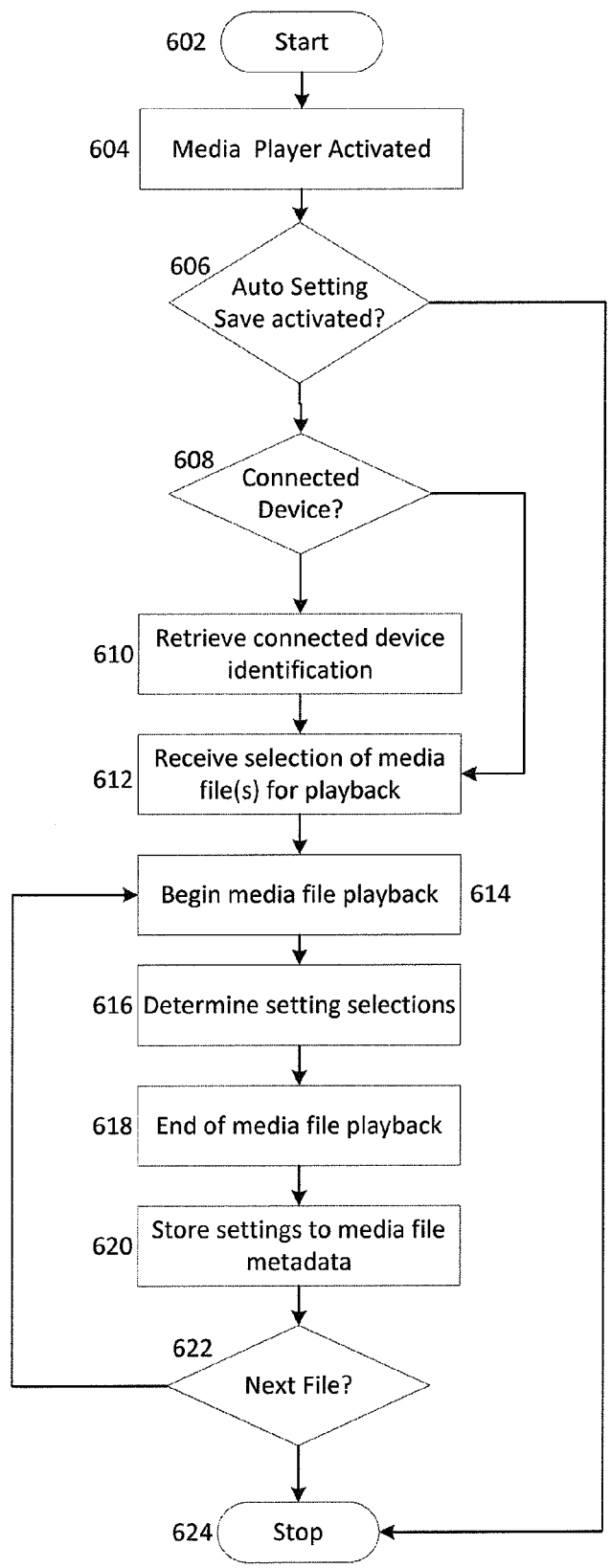
Figure 7:
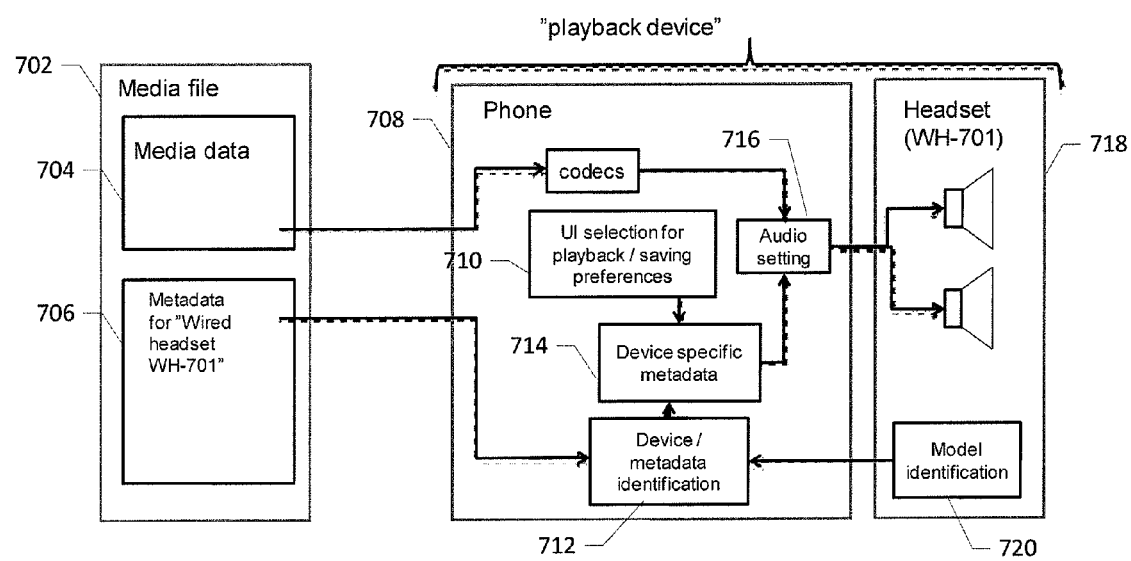

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 illustrates an example intelligent playback system for performing operations in accordance with an example embodiment of the present invention;

FIG. 3 illustrates an example of multiple sets of settings that may be stored in the multimedia metadata in accordance with an example embodiment of the present invention;

FIG. 4 is an example of device-specific metadata in accordance with an example embodiment of the present invention;

FIG. 5 is a flow chart illustrating operations for providing device playback preferences in multimedia metadata performed by an apparatus in accordance with an example embodiment of the present invention;

FIG. 6 is a flow chart illustrating operations for storing device playback preferences in multimedia metadata performed by an apparatus in accordance with an example embodiment of the present invention; and FIG. 7 illustrates an example intelligent playback system for performing operations in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention to provide device playback preferences or settings in multimedia file metadata.

Embodiments of the present invention relate to an intelligent playback system wherein device-specific audio parameters may be provided using multimedia file metadata so that higher quality playback may be achieved based on the connected device and the provided metadata. Embodiments may provide track specific settings for a type of output interface (e.g., speaker, headset, or the like) to the playback device and allow for the settings data to be carried with the track across devices. For example, a mobile phone may allow the user to change various settings such as loudness and equalization when playing music files. The user may also connect the mobile phone to a variety of sound output devices when playing music files, such as a Bluetooth stereo headset, a vehicle audio system, or a portable speaker. In some embodiments, the playback settings data may comprise parameters or values for a specific feature (e.g. equalizer, loudness, etc.), indications or hints of a defined configuration or preset (e.g. rock, classical, jazz, etc.) to use for playback, or the like.

In example embodiments, the metadata may be provided as part of the media file to be played back, provided in a separate file or provided to a playback device by means such as short message service (SMS) or the like, or any combination of such.

Some example embodiments may provide for storing the user's preferred settings for each connected output device in the multimedia file metadata (or as data separate from the multimedia file), such as loudness: off and equalization: rock for the stereo headset, loudness: off and equalization: bass boost for the vehicle audio, and loudness: on and equalization: jazz for the portable speaker. Embodiments may then automatically adjust the mobile phone user settings based on the connected output device and the metadata in the multimedia file when the multimedia track is played back. Embodiments may allow for a user to easily be provided the best listening experience for each of the devices when they are connected.

For example, a user may be using a smart phone as a music playback device and may connect the smart phone to a variety of music accessories, having to adjust the audio settings to provide the preferred audio experience for each of the accessories. The user may first be listening to a particular song with the smart phone integrated speaker and may adjust the volume and equalization accordingly. The user may then decide to connect stereo headphones to the smart phone to listen to the particular song and would have to again adjust the volume and equalization based on the headphone capabilities, such as adjusting for poor bass response in the headphones. The user may want a friend to hear the particular song and decide to switch to a Bluetooth speaker, again having to adjust the volume and equalization to provide the preferred response over the speaker. In embodiments of the present invention, the settings for the various music accessories and the integrated speaker may be stored in the metadata of the particular song file allowing the playback device to automatically switch the settings as the connected device is changed and provide the preferred listening experience.

In another example, the playback device may be changed as the user moves between locations and the settings on the different devices must be managed to provide the preferred experience. For example, a user may use a phone to play a particular song with a speaker at work and adjusts the volume and equalization accordingly. The user may then move to her car to drive home and want to listen to the song over the car audio system, and the car audio system settings may need to be adjusted, such as to compensate for car or road noise. Then at home, the user may want to listen to the song through her television sound system and may need to adjust the volume or the bass boost to have the desired listening experience. In example embodiments, the settings for the various playback devices may be stored in the metadata of the song file allowing for switching playback devices and automatically switching the settings so individual device adjustments are not needed to provide the preferred listening experience.

In example embodiments, the multimedia metadata may store a plurality of settings for a particular device when playing the multimedia file, for example, volume, equalization, spatial surround preferences, multichannel conversion, automatic noise cancellation, etc. The type of settings stored in the metadata may be dependent on the type of identified device, i.e. the user configurable settings for the type of device. In some example embodiments, the preferences may be selected using the user interface of the playback device and the settings may then be stored to the multimedia file metadata or as metadata in a separate file.

In some example embodiments, the multimedia metadata may include user setting preferences for multiple different devices. In some example embodiments, the multimedia metadata may further include settings from third-parties such as recommended settings from a device manufacturer, a media distributor, or an artist. In some example embodiments, a user may store multimedia playback settings to the metadata based on the type of device, the user preference, the environment, etc. In some example embodiments, a user may use existing device specific metadata, select from several options, or store their individual preferences.

In some embodiments, the metadata may provide device-specific settings, such as provided by a device manufacturer, media distributor, artist, etc., which the user may then be able to modify based on the user's preferences and which may also be saved to the metadata, or alternatively to a memory in a device. In some embodiments, the metadata may provide an indication that activates a preferred playback option from a selection of playback options stored in a memory of a device.

In some example embodiments, multiple settings may be provided for an individual playback device, and the different settings may be organized by layers or priorities. For example, multimedia metadata may provide multiple sets of preferences for an individual playback device, such as artist recommended settings, distributor recommended settings, device specific settings, context specific settings, and user defined settings, for example. In some embodiments, if there are several sets of settings for the same playback event, i.e. the type of device, the settings to be used may be selected based on a priority or the multiple settings may be presented to the user for selection.

The system of an embodiment of the present invention may include an apparatus 100 as generally described below in conjunction with FIG. 1 for performing one or more of the operations set forth by FIGS. 5 and 6 and also described below. In this regard, the apparatus may be embodied by a computing device such as a personal computer, a mobile device, a mobile phone, a smartphone, a personal digital assistant, a media player, a music player, or the like.

It should also be noted that while FIG. 1 illustrates one example of a configuration of an apparatus 100 for providing device playback preferences in multimedia metadata, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, an apparatus 100 for providing device playback preferences in multimedia metadata in accordance with an example embodiment may include or otherwise be in communication with one or more of a processor 102, a memory 104, a user interface 106, and a communication interface 108.

In some embodiments, the processor (and/or co-processors or any other processing circuitry assisting or otherwise associated with the processor) may be in communication with the memory 104 via a bus for passing information among components of the apparatus. The memory device 104 may include, for example, a non-transitory memory, such as one or more volatile and/or non-volatile memories. In other words, for example, the memory 104 may be an electronic storage device (e.g., a computer readable storage medium) comprising gates configured to store data (e.g., bits) that may be retrievable by a machine (e.g., a computing device like the processor). The memory 104 may be configured to store information, data, content, applications, instructions, or the like for enabling the apparatus to carry out various functions in accordance with an example embodiment of the present invention. For example, the memory 104 could be configured to buffer input data for processing by the processor 102. Additionally or alternatively, the memory 104 could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 100 may include a user interface 106 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The apparatus 100 may optionally include a communication interface 108 which may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB), WiFi, Bluetooth, or other mechanisms.

FIG. 2 illustrates an example intelligent playback system for performing operations in accordance with an example embodiment of the present invention. A multimedia file (e.g. an audio file or video file), such as media file 202, may comprise multimedia content, such as media data 204, and multimedia metadata, such as metadata 206. In some embodiments, the metadata 206 may comprise metadata representing settings for one or more playback devices or playback interfaces, such as playback devices 208, 210, and 212. In some embodiments that playback device may be the device storing or receiving the media file or it may be an external device such as a headset, speaker, sound system, or the like. In some embodiments, the settings may comprise preferences for settings for playback of the media data 204 on a particular device, such as playback device 208. In some embodiments, the settings may comprise user configurable settings for the playback device. The settings may comprise preferences for one or more of volume, equalization, spatial surround preferences, multichannel conversion, automatic noise cancellation, or the like. In some embodiments, the settings may have been selected by a user, such as context specific or device specific settings, or provided by a third-party such as a device manufacturer, a media distributor, or an artist. In some embodiments, the settings may comprise an indication of a preferred device playback option (e.g., a preset stored in the device memory) to be used for playback of the multimedia file.

In some embodiments, a device, such as playback device 208 may perform operations for identifying and using device playback settings stored in multimedia metadata, such as metadata 206. Playback device 208 may comprise device/metadata identification module 218 which may search the metadata 206 in media file 202 to determine the settings to be used by playback device 208 when playing the media data 204. Device specific metadata module 220 may use the identified settings metadata data to adjust the audio settings 216 for playback of media data 204. User interface 214 may provide for the selection of playback settings for playback device 208 and may also provide for saving the playback settings for the device to metadata 206.

FIG. 3 illustrates an example of multiple sets of settings that may be stored in the multimedia metadata in accordance with an example embodiment of the present invention. In some embodiments, metadata 206 may comprise a plurality of settings for a particular device, such as playback device 208. The multiple settings included in metadata 206 may be organized into layers or priorities, such as metadata 302. The metadata 302 may comprise artist recommended settings for the playback device, media distributor recommended settings for the playback device, device specific recommended settings (such as from the device manufacturer), context specific settings for the playback device (e.g. use these settings in the car and at this location), and user specific settings for the playback device, for example. In some embodiments, when there are multiple settings for a playback device, priority criteria may be used to select the appropriate settings to use, such as selecting user specific settings before selecting distributor recommended settings, for example, or alternatively, the multiple settings may be presented to a user for selection.

In some embodiments, some of the settings stored in the metadata may be user configurable, such as context specific preferences and user device specific preferences, and some of the settings may be provided by third-parties, such as artist recommended settings, media distributor recommended settings, and device specific recommended settings from the manufacturer. In some embodiments, the user may also be able to modify any of the recommended settings (e.g. the device, distributor, or artist recommended settings) and may also be able to store the modified settings in the metadata, a separate file, or a memory of the device.

The media playback settings for individual devices may be stored in the metadata of a multimedia file. For example, in some embodiments, the storing of device settings may be implemented using a MP3 file ID3v2 Tag data extension, an APE Tag, Resource Interchange File Format (RIFF) Tags, Vorbis Comments, Broadcast Wave Format (BWF), or the like. In some embodiments, the playback device may implement the metadata or tag manipulation to store and use the device playback settings. In some example embodiments, the metadata may be provided separately from the multimedia file.

FIG. 4 provides an example ID3 Tag content showing the headers and frames that may be provided in an example embodiment for storing device-specific metadata. For example, the Header may identify the ID3 Tag content and Frame 1 may provide the device identifier and the number of settings and how they are identified. The following frames may then provide the various groups of settings that may be used on the identified device for playback of the multimedia file that contains the ID3 Tag. While this example of using ID3 Tags for storing device playback settings is provided here, it is not intended that the embodiments be in any way limited to using ID3 Tags for storing the metadata regarding playback settings.

FIG. 5 is a flow chart illustrating operations for providing device playback preferences in multimedia metadata performed by an apparatus in accordance with an example embodiment of the present invention.

In this regard, the apparatus 100 may include means, such as the processor 102, memory 104, or the like, for using device preferences stored in multimedia metadata. See block 502 of FIG. 5. For example, the apparatus 100 may include means, such as the processor 102, memory 104, user interface 106, or the like, for receiving an indication from a user to activate a media player application of the apparatus. See block 504 of FIG. 5.

The apparatus 100 may include means, such as the processor 102, memory 104, or the like, for determining if a device is connected to the apparatus for media playback, such as a Bluetooth accessory, a WiFi speaker, a WiFi headset, a wired headset, a wired speaker, a CarKit, a home audio system, or the like. See block 506 of FIG. 5. If there is no connected device, operation continues to block 508 and the apparatus may indicate that settings for the internal output interface (e.g. an integrated speaker) should be used. Operation may then continue to block 514. If the apparatus determines a device is connected, operation may continue to block 510.

As shown in block 510 of FIG. 5, the apparatus 100 may also include means, such as the processor 102, memory 104, or the like, for determining what device has been connected. For example, a wireless connection may identify the device or a wired interface, such as an ECI interface, may identify the connected device. As shown in block 510 of FIG. 5, if the connected device cannot be identified, the apparatus 100 may also include means, such as the processor 102, memory 104, or the like, for indicating that settings for a default device should be used and operation may continue to block 514. If the connected device is identified, operation may continue to block 514.

As shown in block 514 of FIG. 5, the apparatus 100 may also include means, such as the processor 102, memory 104, or the like, for searching the metadata of the selected or received multimedia file for the appropriate settings. For example, the apparatus 100 may search for settings for the device identified at block 510, settings for the default device indicated at block 512, or settings for the internal interface indicated at block 508, as appropriate. As shown in block 516 of FIG. 5, the apparatus 100 may also include means, such as the processor 102, memory 104, or the like, for adjusting the playback settings based on any settings found in the metadata at block 514.

As shown in block 518 of FIG. 5, the apparatus 100 may also include means, such as the processor 102, memory 104, or the like, for causing playback of the selected multimedia file. Once the selected multimedia file has been played back, operation continues to block 520 where the apparatus 100 may include means, such as the processor 102, memory 104, or the like, for determining if another multimedia file has been selected for playback. If no further files are selected for playback, operation continues to block 522 and operation ends. If the apparatus determines that a next file should be played, operation may return to block 514 to search the metadata of the next file for playback settings.

FIG. 6 is a flow chart illustrating operations for storing device playback preferences in multimedia metadata performed by an apparatus in accordance with an example embodiment of the present invention.

In this regard, the apparatus 100 may include means, such as the processor 102, memory 104, or the like, for identifying and causing device preferences to be stored in multimedia metadata. See block 602 of FIG. 6. For example, the apparatus 100 may include means, such as the processor 102, memory 104, user interface 106, or the like, for receiving an indication from a user to activate a media player application of the apparatus. See block 604 of FIG. 6.

The apparatus 100 may include means, such as the processor 102, memory 104, user interface 106, or the like, for determining if a selection has been received to automatically save settings to metadata. See block 606 of FIG. 6. If setting save has not been activated, operation continues to block 624 and the operation may end. If the apparatus determines that setting save has been activated, operation may continue to block 608. In some embodiments, playback settings may automatically be saved to multimedia file metadata and as such this operation may be eliminated in such embodiments. In some embodiments, playback settings may be automatically saved for new media files added to a device.

The apparatus 100 may include means, such as the processor 102, memory 104, or the like, for determining if a device is connected to the apparatus, such as a Bluetooth accessory, a WiFi speaker, a WiFi headset, a wired headset, a wired speaker, a CarKit, or the like. See block 608 of FIG. 6. If there is no connected device, operation continues to block 612. If the apparatus determines a device is connected, operation may continue to block 610.

As shown in block 610 of FIG. 6, the apparatus 100 may also include means, such as the processor 102, memory 104, or the like, for determining the identification of the connected device. For example, a wireless connection may identify the device or a wired interface, such as an ECI interface, may identify the connected device.

As shown in block 612 of FIG. 6, the apparatus 100 may also include means, such as the processor 102, memory 104, user interface 106, or the like, for receiving selection of media files to be played back. The apparatus 100 may also include means, such as the processor 102, memory 104, or the like, for causing the media file to be played back. See block 614 of FIG. 6.

As shown in block 616 of FIG. 6, the apparatus 100 may also include means, such as the processor 102, memory 104, user interface 106, or the like, for monitoring changes to the device playback settings during playback of the media file. As shown in block 618 of FIG. 6, the apparatus 100 may also include means, such as the processor 102, memory 104, or the like, for determining that the media file playback has ended.

As shown in block 620 of FIG. 6, the apparatus 100 may also include means, such as the processor 102, memory 104, or the like, for causing the playback settings to be stored in the multimedia file metadata, in a separate file, or in a memory.

As shown in block 622 of FIG. 6, the apparatus 100 may include means, such as the processor 102, memory 104, or the like, for determining if another multimedia file has been selected for playback. If no further files are selected for playback, operation continues to block 624 and operation ends. If the apparatus determines that a next file should be played, operation may return to block 614 where playback of the next media file is started.

FIG. 7 illustrates another example intelligent playback system for performing operations in accordance with an example embodiment of the present invention. As shown in FIG. 7, the playback device may comprise a phone 708 and a wired headset 718 connected to the phone, for example.

A multimedia file, such as media file 702, may comprise multimedia content (e.g. audio or video), such as media data 704, and multimedia metadata, such as metadata 706. The metadata 706 may comprise metadata representing settings for wired headset WH-701.

The phone 708 may receive model identification 720 from the headset 718 when the headset is connected to the phone. Device/metadata identification 712 may use the model identification 720 to search the metadata 706 for settings to be used with the headset 718 when playing back media data 704. Device specific metadata 714 identified from the metadata 706 may be used to adjust audio settings 716 as appropriate to provide the preferred listening experience with headset 718. The user interface 710 may also be used to select playback preferences, adjust the audio settings 716, and cause the preferences to be stored in the metadata 706.

As described above, FIGS. 5 and 6 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   identifying one or more playback devices connected with a media playback system;
   receiving a multimedia file to be played back by the media playback system using the identified one or more playback devices;
   receiving a multimedia file metadata, either as part of the multimedia file or separate from the multimedia file, comprising one or more sets of audio playback settings of the identified one or more playback devices for adjusting audio playback based on the one or more sets of audio playback settings during playback of the multimedia file;
   searching one or more data in the multimedia file metadata for audio playback settings of the identified one or more playback devices as connected with the media playback system;
   selecting the one or more data in order to create a listening experience for the multimedia file during playback from the media playback system via the identified one or more playback devices;
   processing the multimedia file with the selected one or more data so as to playback the multimedia file from the identified one or more playback devices; and
   causing playback of the multimedia file with the identified one or more playback devices based on the processed multimedia file.

2. The method of claim 1, wherein the one or more data comprises metadata for audio playback settings of the one or more playback devices.

3. The method of claim 1, wherein the one or more data is provided in at least one of the multimedia file to be played back and a separate data file.

4. The method of claim 1, wherein the one or more data provides at least one of: one or more indications for selecting the audio playback settings and one or more values for the audio playback settings.

5. The method of claim 1, wherein the one or more sets of audio playback settings are based at least in part on one or more of: artist-specific recommendations, distributor-specific recommendations, device specific recommendations, context specific recommendations, and user device-specific preferences.

6. The method of claim 5, wherein the one or more sets of audio playback settings can be modified by a user.

7. The method of claim 5, wherein the context specific recommendations are determined by the one or more playback devices and the audio playback settings are adjusted automatically.

8. The method of claim 1, further comprising:
   receiving changes to the audio playback settings of the one or more playback devices during playback of the multimedia file; and
   causing the audio playback settings to be stored in at least one of:
      the multimedia file comprising the changed audio playback settings and the one or more data,
      the multimedia file comprising the changed audio playback settings by overwriting the one or more data,
      an internal memory comprising the changed audio playback settings or the multimedia file, and
      a memory location accessed by the one or more playback devices.

9. The method of claim 1, wherein the one or more sets of audio playback settings for the one or more playback devices are provided in the multimedia file using at least one of: ID3 Tags, APE Tags, Resource Interchange File Format (RIFF) Tags, Vorbis Comments, or Broadcast Wave Format (BWF).

10. An apparatus comprising at least one processor and at least one memory including computer program instructions, the at least one memory and the computer program instructions configured to, with the at least one processor, cause the apparatus at least to:
    identify one or more playback devices connected with a media playback system;
    receive a multimedia file to be played back by the media playback system using the identified one or more playback devices;
    receive a multimedia file metadata, either as part of the multimedia file or separate from the multimedia file, comprising one or more sets of audio playback settings of the identified one or more playback devices for adjusting audio playback based on the one or more sets of audio playback settings during playback of the multimedia file;
    search one or more data in the multimedia file metadata for audio playback settings of the identified one or more playback devices as connected with the media playback system;
    select the one or more data in order to create a listening experience for the multimedia file during playback from the media playback system via the identified one or more playback devices;
    process the multimedia file with the selected one or more data so as to playback the multimedia file from the identified one or more playback devices; and
    cause playback of the multimedia file with the identified one or more playback devices based on the processed multimedia file.

11. The apparatus of claim 10, wherein the one or more data comprises metadata for audio playback settings of the one or more playback devices.

12. The apparatus of claim 10, wherein the one or more data is provided in at least one of the multimedia file to be played back and a separate data file.

13. The apparatus of claim 10, wherein the one or more data provides at least one of: one or more indications for selecting the audio playback settings and one or more values for the audio playback settings.

14. The apparatus of claim 10, wherein the one or more sets of audio playback settings are based at least in part on one or more of: artist-specific recommendations, distributor-specific recommendations, device specific recommendations, context specific recommendations, and user device-specific preferences.

15. The apparatus of claim 14, wherein the one or more sets of audio playback settings can be modified by a user.

16. The apparatus of claim 14, wherein the context specific recommendations are determined by the one or more playback device and the audio playback settings are adjusted automatically.

17. The apparatus of claim 10, the at least one memory and the computer program instructions further configured to, with the at least one processor, cause the apparatus at least to:

receive changes to the audio playback settings of the one or more playback devices during playback of the multimedia file; and cause the audio playback settings to be stored in at least one of:
 the multimedia file comprising the changed audio playback settings and the one or more data,
 the multimedia file comprising the changed audio playback settings by overwriting the one or more data,
 an internal memory comprising the changed audio playback settings or the multimedia file, and
 a memory location accessed by the one or more playback devices.

18. The apparatus of claim 10, wherein the one or more sets of audio playback settings for the one or more playback devices are stored in the file using ID3 Tags, APE Tags, Resource Interchange File Format (RIFF) Tags, Vorbis Comments, or Broadcast Wave Format (BWF).

* * * * *